United States Patent Office 2,777,165
Patented Jan. 15, 1957

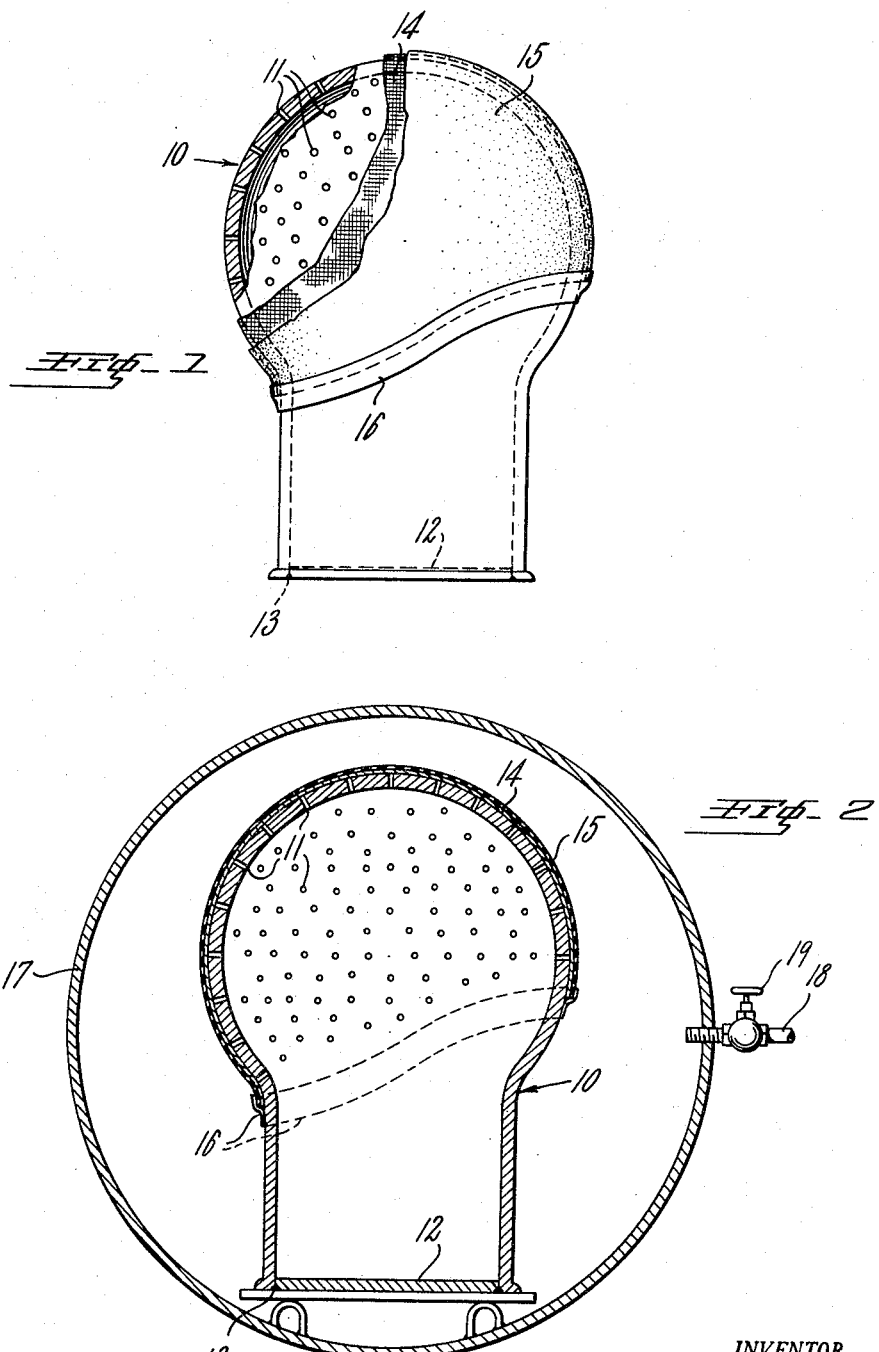

---

2,777,165

METHOD OF MOLDING A PLASTIC BLANK UPON A HOLLOW FORM

Victor H. Hurt, Cranston, R. I., assignor to United States Rubber Company, New York, N. Y., a corporation of New Jersey Application February 9, 1953, Serial No. 335,852

3 Claims. (Cl. 18—56)

---

This invention relates to an improved method of molding a plastic blank, such as unvulcanized rubber or other thermoplastic material on a curved hollow mold.

The present invention may be employed to mold bathing caps, articles of footwear, and other articles of manufacture upon a curved hollow mold or form, so as to impart to the article of manufacture the contour of such form. The present invention may also be used to impart to such article of manufacture an ornamental surface design during the molding or vulcanizing operation.

In my prior Patent No. 2,354,916, entitled Method and Apparatus for Embossing Plastic Sheet Material, there is shown, described and claimed apparatus for and method of embossing and molding a bathing cap upon a rigid hollow form, having the approximate shape of the head of the person who is to wear such cap. In accordance with the disclosure of such patent there is shown a hollow form that has the area which is to be covered by the cap provided with a large number of minute holes extending from the outer surface to the interior of the hollow mold, and the interior of this mold is connected to vacuum means whereby air can be exhausted from the interior of the mold. The arrangement is such that when an unvulcanized rubber blank having the approximate shape of such form is placed over the form so as to overlie the holes, and the edges of the blank are sealed to the non-perforated portion of the mold, the blank can be held in close conformation to the hollow form by exhausting air from the interior of the form.

The present invention contemplates a simplification of the invention of said patent, in that I have determined that satisfactory results can be secured without employing the vacuum feature, just mentioned, to hold the blank in close conformation to the curved surface of the form.

In order to carry out the present invention whereby a bathing cap or other article of manufacture may be molded or vulcanized to the shape of a curved hollow form, it is necessary to provide a rigid hollow form that has a perforated area and a non-perforated area, so that when the perforated area is covered with a pre-shaped blank, and the edges of this blank are sealed against the non-perforated area of the form, all communication between the exterior and interior of the mold or form is prevented. The mold with the blank positioned thereon in the manner just described is now subjected to heat and external pressure, as by placing such mold in a pressure vulcanizer, to built up a pressure outside of the mold that exceeds by about a pound or more the pressure inside the mold. This will cause a pressure to be exerted on the mold and blank that exceed the pressure within the hollow mold, since all of the perforations leading to the interior of the mold are sealed off by the blank secured over these perforations, and the pressure outside of the mold is prevented from being built up to a corresponding pressure within the air tight mold. As a result of the ambient or surrounding pressure upon the blank, this pressure holds the blank firmly against the mold throughout the vulcanizing or heat setting period.

The present method has substantial advantages over the method described in my above cited patent, in that it permits the use of a pressure vulcanizer that is free from vacuum tubes extending to each mold, such as was employed heretofore to produce a vacuum within each hollow mold during the vulcanizing or heat molding operation.

The above and other features of the present invention will be further understood from the following description when read in connection with the accompanying drawing showing one form of apparatus for carrying out the method; and wherein Fig. 1 is a side elevation with parts in section of a hollow mold having a bathing cap positioned thereupon; and Fig. 2 is a vertical sectional view through the mold and bathing cap of Fig. 1 and shows the mold as positioned within a pressure vulcanizer.

As above stated, the method of the present invention may be employed to impart the desired molded shape to various hollow articles such as bathing caps, footwear and the like. The apparatus shown to illustrate how to practice the present method is the type of apparatus used in making bathing caps, and there is shown in Figs. 1 and 2 of the drawing a hollow mold or form 10 made of metal or rigid plastic material that is capable of withstanding the pressure and temperatures employed in practicing the present method. The upper rounded portion of this form 10 is provided with a large number of small apertures 11 such as drill holes disposed over substantially the entire area of the mold that is to be covered by the bathing cap during the molding or vulcanizing period. The lower portion of the mold 10 is formed without apertures, and the lower end portion of this hollow mold is completely closed with the end disk 12 which, if these parts are made of metal, may be welded in place as indicated by 13. The arrangement is such that when the apertures 11 are closed the interior of the mold is sealed off from the atmosphere exterior thereof.

The hollow mold 10 may be employed solely for the purpose of molding or vulcanizing a bathing cap or the like to the desired contour. It may also be employed to emboss or impress an ornamental design upon the bathing cap during the molding or vulcanizing operation. The apparatus shown serves to impress an ornamental design upon the inner face of the bathing cap during the vulcanizing operation. This is accomplished by providing over the apertured portion of the mold 10 a sheet of foraminous material such as the fabric covering 14 that is shaped to fit the dome portion of the mold snugly as shown. This fabric permits air under the cap to find its way to the apertures 11, and the weave of this fabric may serve to impress upon the inner surface of the bathing cap blank 15 the desired ornamental design, or this fabric may have embroidered or otherwise imparted thereto an ornamental design that is to be impressed upon the inner face of the bathing cap.

The porous sheet or fabric 14 when placed upon the dome portion of the form 10 as shown in Figs. 1 and 2, should not extend to the lower marginal edge of the bathing cap blank 15. This is important so that when a bathing cap blank 15 is placed upon the form over the fabric 14 its lower edges will engage the surface of the form 10, and the lower edges of this cap are preferably tightly sealed to the form by placing over such edges and in contact with the form a strip of adhesive tape 16. It is important that when the bathing cap blank 15 is in place and its lower edges are sealed to the form that the perforated area of the form be completely sealed off from the atmosphere, so that when an above atmosphere pressure is build up outside the form a corresponding air pressure will not be established inside of the form.

When the parts are in place as shown in Fig. 1 the form with the cap thereupon is ready to be moved into a pressure vulcanizer 17 such as the usual steam vulcanizer in which steam is admitted to the interior of the tightly closed vulcanizer by any suitable means such as a steam pipe 18 controlled by a valve 19. The steam serves to raise the temperature inside of the vulcanizer and to build up a pressure about the mold 10 that exceeds the pressure of the air from the atmosphere confined in the mold.

Since the interior of the mold 10 is completely sealed off from the exterior of the mold and the pressure build up in the vulcanizer does not exist in the interior of the mold, the difference in pressure between the exterior and interior of the mold causes the bathing cap 15 to be pressed snugly against the fabric 14 covering the mold, throughout the vulcanizing operation. At the time the cap is applied to the mold 10 over the apertures 11 the interior and exterior of the mold will be subject to atmospheric pressure, and after these apertures are covered by sealing the cap 15 in place, this atmospheric pressure will remain inside of the mold even after this mold is placed in the vulcanizer and an appreciable pressure is built up in the vulcanizer, except that the heat of the vulcanizer will cause some expansion of the air confined inside of the mold. By employing the method of the present invention a pressure of one to several pounds per square inch may readily be produced upon the exterior of the mold over the pressure produced by the expanded air at the interior of the mold. This is sufficient to hold the cap snugly about the mold and under sufficient exterior pressure to cause the unvulcanized rubber of the blank 15 to take the impression of the design carried by the porous cover 14. If this cover 14 does not carry any special design, as for example a cover of stockinet, its use will serve to prevent the raw rubber from taking the impression of the apertures 11, and will also permit air confined within the cap to flow over the surface of the form to an aperture 11 so that no air will be trapped between the surface of the form and the inner face of the cap. The porous cover 14 may in some cases be omitted but then the pressure outside the mold should exceed by only a slight amount the pressure inside the mold, so that the outside pressure will not force the blank stock into the apertures 11.

While the method of the present invention has been herein described as employed to produce bathing caps, it will be understood that it can be used to produce various other molded hollow articles, such as articles of footwear, whether such articles are formed of raw rubber containing a vulcanizing agent so that the same will be vulcanized upon the application of heat, or is formed of a plastic such as a vinyl resin having thermoplastic properties and will be softened by the heat supplied by the vulcanizer 17. In either case the heat within such vulcanizer and the above atmospheric pressures therein, which exceeds the pressure inside the mold, will soften the plastic material and mold it to the contour of the form 10.

Having thus described my invention, what I claim and desire to protect by Letters Patent is:

1. The method of molding a thin plastic article on a curved form, which comprises providing a hollow molding form that has perforations in the molding area and which is completely closed to the passage of fluid to the interior of the form except through the perforations, placing over said perforated area a plastic blank having the approximate shape of said molding area and sealing the edges of this blank against a non-perforated area of the form so that it covers the entire perforated area of the form, then subjecting the blank and form to an elevated temperature, and maintaining a fluid pressure above atmospheric externally of the form sufficient to provide a pressure differential across the form at the elevated temperature so that the external pressure on said form exceeds the pressure within the form and molds the hot blank to the shape of the form.

2. A method in accordance with claim 1 which includes the step of placing over the perforated area of the form and intermediate the form and the blank a porous sheet that embodies a surface design to be imparted to the rubber article.

3. The method of molding and vulcanizing a bathing cap, which comprises providing a hollow generally closed and fluid impervious molding form having openings therein only in a perforated molding area, placing over this perforated area a porous sheet that embodies a design to be imparted to the bathing cap, applying a cap blank of unvulcanized rubber over said porous sheet and sealing the edges of this blank over a non-perforated area of the form so that it covers the entire perforated area, then subjecting the blank and form to an elevated temperature while maintaining a pressure above atmospheric externally of the form sufficient to provide a pressure differential across the form at the elevated temperature so that the external pressure on said form exceeds the pressure within the form by subjecting the form to pressurized steam in a closed chamber to mold and vulcanize the bathing cap.

References Cited in the file of this patent

UNITED STATES PATENTS

| Number | Name | Date |
|---|---|---|
| 130,140 | Judson | Aug. 6, 1872 |
| 1,540,782 | Bates | June 9, 1925 |
| 1,592,536 | O'Neill | July 13, 1926 |
| 2,132,185 | Pryale | Oct. 4, 1938 |
| 2,335,139 | Wright | Nov. 23, 1943 |
| 2,354,916 | Hurt | Aug. 1, 1944 |
| 2,411,497 | Barnes | Nov. 26, 1946 |